United States Patent [19]

Garden

[11] 3,936,581

[45] Feb. 3, 1976

[54] HARDENABLE COMPOSITIONS

[75] Inventor: William David Garden, Manchester, England

[73] Assignee: Imperial Chemical Industries Limited, London, England

[22] Filed: Apr. 29, 1974

[21] Appl. No.: 465,439

[30] Foreign Application Priority Data

May 3, 1973  United Kingdom............... 21014/73

[52] U.S. Cl..... 428/447; 260/46.5 G; 260/46.5 UA; 260/825; 427/387; 427/391; 428/342; 428/537
[51] Int. Cl.²........................................... B32B 27/10
[58] Field of Search....... 260/46.5 UA, 46.5 G, 825; 117/155 R, 161 ZA; 427/387, 391; 428/342, 447, 537

[56] References Cited

UNITED STATES PATENTS 3,458,469  7/1969  Murphy .................. 260/46.5 G

*Primary Examiner*—Lewis T. Jacobs
*Attorney, Agent, or Firm*—Cushman, Darby & Cushman

[57] ABSTRACT

Solventless paper treating compositions based on organopolysiloxanes comprising 80–99 pbw liquid hydroxy-ended diorganopolysiloxane, 1–20 pbw liquid organohydrogenpolysiloxane, up to 0.1 pbw (as platinum) of an organic sulphur complex of platinum and a selected olefin in amount such that there is present not less than 0.1 mole of olefinic double bond per g.atom of Pt.

17 Claims, No Drawings

HARDENABLE COMPOSITIONS

This invention relates to hardenable compositions and more particularly to such compositions based on organopolysiloxanes.

A variety of liquid organopolysiloxane compositions are known and available which are liquid and which when used or applied to a substrate are hardened by the use of a catalyst with or without the application of heat. Hitherto the liquid organopolysiloxane compositions have usually been dissolved in solvent and in some cases subsequently emulsified, before application to the substrate which is then heated to drive off solvent or water and to convert the liquid organopolysiloxane composition to a solid material. In a commercial process it is desirable that the time required, i.e. the cure time, should be short. It is also advantageous in a commercial process to apply a catalysed liquid organopolysiloxane composition directly to the substrate without the use of solvent thus avoiding the expense, time and labour required to dilute the organopolysiloxane composition with solvent and subsequently to evaporate and, where desired, recover the solvent. Various types of catalyst may be employed but an organic complex of platinum is advantageous because only small amounts are required and the chemical nature of the organopolysiloxane composition is therefore virtually unaffected.

We have now found that liquid organopolysiloxane compositions catalysed with certain organic complexes of platinum have their cure time shortened by the addition of a proportion of certain compounds containing at least one olefinic double bond.

According to the present invention a new and improved hardenable composition comprises 80 to 99 parts by weight of a liquid hydroxy-ended diorganopolysiloxane, 1 to 20 parts by weight of a liquid organohydrogenpolysiloxane, up to 0.1 part by weight (calculated as platinum) of an organic sulphur complex of platinum per 100 parts by weight of total organopolysiloxanes and a compound containing at least one olefinic double bond in which the remaining valences of the 2 carbon atoms are satisfied by bonding to a hydrogen atom, an ether radical, a silicon atom, a sulphur atom or a monovalent carbyl radical in which the three remaining valences of the carbon atom thereof are satisfied by bonding atoms selected from carbon, silicon, sulphur, hydrogen and oxygen provided that not more than two of the valences are satisfied by bonding to oxygen, said compound being free from phosphorus, arsenic and divalent sulphur and not being a derivative of ammonia in which the three N valences are satisfied by bonding to an atom from the group S, H, O, N or Si, and being present in amount such that there is not less than 1 mol of olefinic double bond per g. atom of Pt.

While the diorganopolysiloxane may be used in amount from 80 to 99 parts it is generally preferred that it be used in amount from 86 to 96 parts. It is also preferred that the viscosity of the diorganopolysiloxane be not less than 50 cP at 20°C. The organo groups in the diorganopolysiloxane may be alkyl, aryl, alkaryl, aralkyl or cycloalkyl groups. Suitable groups include, for example, methyl, ethyl, propyl, phenyl, and tetrachlorophenyl, trifluoromethyl and cyclohexyl groups. In general it is preferred that the organo groups be methyl groups. The diorganopolysiloxane may also contain hydroxyl groups in addition to the two terminal hydroxyl groups.

While the organohydrogenpolysiloxane may be used in amounts from 1 to 20 parts by weight it is normally preferred to use from 4 to 14 parts. It is also in general preferred that the viscosity of the organohydrogenpolysiloxane be from 10 to 100 cP at 20°C.

The organo groups in the organohydrogenpolysiloxane may be the same as those in the diorganopolysiloxane. It is also preferred that they be methyl groups. The proportion of hydrogen in the organohydrogenpolysiloxane may vary widely, for example, from an H/Si ratio of 1:10 to 1:1. In general it is preferred that it consists of a chain of methylhydrogensiloxy units.

The liquid organopolysiloxane compositions of our invention may be diluted with solvent, for example a hydrocarbon, a chlorinated hydrocarbon, or an ether and may contain minor amounts of an alkoxy or aroxy silane or siloxane, for example, ethyl silicate, methyl triethoxy silane, or a methylhydrogenpolysiloxane in which a proportion of the hydrogen atoms attached to silicon have been replaced by alkoxy or aroxy groups such as ethoxy or phenoxy groups.

Suitable organic sulphur complexes of platinum, are compounds of platinum containing one or more ligand (or donor) organo-sulphur groupings of divalent sulphur which can donate electrons to form a bond with the platinum metal. Suitable groupings include dimethyl sulphide, diethyl sulphide and dibutyl sulphide. Suitable complexes include for example bis(diethylsulphide) dichloroplatinum, bis(dibutylsulphide) dichloroplatinum and bis(diethyl sulphide) dichloro-$\mu$-dichlorodiplatinum. Such complexes are known and can be prepared by methods such as, for example, that described in "Inorganic Synthesis" Vol. 6, page 211 (McGraw Hill, New York, 1960: Ed. Rochow).

The platinum complex may be added directly to the liquid organopolysiloxanes or may for convenience be dissolved first in a small proportion of a solvent such as a hydrocarbon, a chlorinated hydrocarbon, or an ether. It may also in general be dissolved in the olefinic compounds particularly where these are hydrocarbons, aldehydes, ketones, acetals, alcohols, esters, ethers, or alkoxysilanes. It may be used in amounts up to 0.1 part by weight (calculated as platinum) per 100 parts by weight of total polysiloxanes. It is, however, in general preferred to use from 0.001 to 0.05 part per 100 parts by weight of total polysiloxanes suitable for use in our invention.

Compounds suitable for use in our invention containing at least one olefinic double bond include, for example, cyclohexene, dicyclopentadiene, 1:3-cyclo-octadiene, cis,cis-1:5-cyclo-octadiene, styrene, butadiene, isoprene, ethyl vinyl ether, 2:3-dihydropyran, 2:5-dihydrofuran, acrolein diethyl acetal, benzoquinone, 2-cyclohexen-1-one, crotonaldehyde, mesityl oxide, allyl alcohol, allyl acetate, 2-allylphenol, allylacetone, divinyl sulphone, cyclic methylvinyl tetrasiloxane, methylvinylpolysiloxanes containing varying proportions of methylvinylsiloxy units and dimethylsiloxy units, methylphenylvinylpolysiloxanes containing varying proportions of methylvinylsiloxy units, methylphenylsiloxy units and dimethylsiloxy units, methylhydrogenallyl oxypolysiloxanes containing varying proportions of methylhydrogensiloxy units and methylallyloxysiloxy units, vinyltriethoxysilane and vinyl tris (2-methoxyethoxy) silane. While these compounds may be used in amount such that the ratio of the proportion of olefinic double bond expressed in mols to the proportion of platinum catalyst expressed in gram atoms of platinum is not less than 1:1 it is preferable to use proportions within the range from 1000:1 to 10:1. Where the olefinic compounds used comprise olefinic double bonds incorporated in organosiloxy units of a polysiloxane then any remaining saturated organosiloxy units, or saturated organohydrogen siloxy units, in the polysiloxane are to be taken as forming part of the total organopolysiloxanes in the composition.

A further feature of our invention is that our faster curing compositions can also be modified to give the advantages of our copending application Ser. No. 411,166 filed Oct. 30, 1973 by incorporating therein ammonia or an ammonia derivative as described in the said application. Suitable ammonia derivatives include primary, secondary and tertiary amines such as n-propylamine, di-n-propylamine, tri-n-propylamine, morpholine, and N,N,N'N'-tetramethylethylenediamine; heterocyclic compounds such as pyridine, quinoline, bipyridyl, aminopyridine, aminopyrimidine, iminazole, and pyrrole, amides such as propionamide, acrylamide, formamide and dimethylformamide; azo compounds such as azobenzene; hydrazides such as benzhydrazide; nitriles such as acetonitrile, acrylonitrile and adiponitrile; hydroxylamines such as diethylhydroxylamine, oximes such as dimethylglyoxime, nitroso compounds such as α-nitroso-β-naphthol, p-nitrosodiphenylamine and N-nitrosodiphenylamine; siloxanes such as polymethyl (β-dimethylaminoethoxy) siloxane; and silazanes such as hexamethyldisilazane. The ammonia or derivative thereof is used, as stated in the said application in amount such that the atomic ratio of Pt to the (ammonia) N atom is from 10:1 to 1:1000. By this means an improved bath life is obtained without derogating from the catalytic action of the platinum complex at the reaction temperature i.e. the catalyst temperature coefficient is increased. This is exceedingly advantageous, for example, to prevent gelation in coating machinery when using a highly reactive composition.

The compositions of our invention may, if desired, contain a proportion of a solvent. It is however quite unnecessary to use any solvent other than the very small amounts which may be introduced with the catalyst or other ingredient other than the the liquid organopolysiloxanes. This gives the great advantage of accelerating the process in that the time formerly needed to volatilise off the solvent after application of the composition to the substrate and before curing can take place is not necessary. In the hitherto available compostions it has not been possible to omit the solvent since this always resulted in a very considerable shortening of the bath life of the catalysed composition.

The compositions of our invention may be applied to a wide variety of substrates, such as, for example, textiles, paper and a variety of laminae to confer water-repellent and/or release properties thereon. Application may be by any of the known methods such as dipping, roller or knife coating. After application the coating is heated to effect curing of the composition. Heat may be applied by any of the normal methods such as passage through an air oven, a heated tower or over infrared heaters.

Our invention is further illustrated by the following examples in which all parts are by weight.

EXAMPLES 1 to 23

The effect of a compound containing an olefinic double bond on the cure time of a liquid organopolysiloxane was determined in the following way:

1. A polysiloxane composition was prepared by mixing 92 parts of a hydroxy-ended dimethylpolysiloxane of viscosity 140 cp at 20°C with 8 parts of a methylhydrogenpolysiloxane of viscosity 20 cp at 20°C and adding a compound containing an olefinic double bond, the compound being added either alone or dissolved in a small amount of a solvent such as toluene or acetone. The catalyst bis (diethyl sulphide) dichloroplatinum II, was then added dissolved in toluene to a concentration of 1/10 mol/liter, the amount of catalyst added being 1/1000 mol per Kg of total polysiloxane (i.e. 0.0195 parts calculated as platinum per 100 parts total polysiloxane).

2. This catalysed polysiloxane composition was applied to vegetable parchment paper at a coat weight of 7 g/m$^2$ half an hour after the addition of catalyst. The coated paper was then placed in a circulating air oven at 140°C and the minimum time required for the coating to cure to a non-smearing solid determined. This time is known as the "cure time". The amount and identity of the olefinic compound used together with the cure time are given in Table 1 below:

TABLE 1

| Example | Compound | Proportion(mols per Kg polysiloxanes) | Cure time (secs.) |
|---|---|---|---|
| (control) | — | — | 22 |
| 1 | ethyl vinyl ether | 0.50 | 15 |
| 2 | 2:3-dihydropyran | 0.50 | 9 |
| 3 | styrene | 0.50 | 9 |
| 4 | benzoquinone | 0.01 | 17 |
| 5 | 1:3-cyclo-octadiene | 0.10 | 17 |
| 6 | cis,cis,1:5-cyclo-octadiene | 0.10 | 17 |
| 7 | dicyclopentadiene | 0.10 | 14 |
| 8 | cyclohexene | 0.20 | 11 |
| 9 | isoprene | 0.20 | 14 |
| 10 | 2-cyclohexene-1-one | 0.20 | 8 |
| 11 | crotonaldehyde | 0.20 | 14 |
| 12 | allyl alcohol | 0.20 | 10 |
| 13 | allyl acetate | 0.20 | 13 |
| 14 | 2-allylphenol | 0.20 | 11 |
| 15 | divinyl sulphone | 0.10 | 16 |
| 16 | allylacetone | 0.20 | 14 |
| 17 | 2:5-dihydrofuran | 0.20 | 17 |
| 18 | mesityl oxide | 0.20 | 14 |
| 19 | vinyltriethoxysilane | 0.10 | 8 |
| 20 | acrolein diethyl acetal | 0.20 | 8 |
| 21 | acrolein diethyl acetal | 0.10 | 11 |
| 22 | acrolein diethyl acetal | 0.01 | 14 |
| 23 | acrolein diethyl acetal | 0.001 | 17 |

EXAMPLES 24 to 25

The procedure of Example 1 was repeated except that the catalyst bis(diethyl sulphide)dichlorplatinum II, was dissolved in toluene to a concentration of 0.01 mol/liter, the amount of catalyst added being 0.0001 mol. per Kg. of total polysiloxanes (i.e. 0.00195 part calculated as platinum per 100 parts total polysiloxanes) and other olefinic compounds were used. The amount and identity of the olefinic compound and the cure time are given in Table II.

TABLE II

| Example | Olefinic compound | Proportion (mols per Kg poly-siloxanes) | Cure time (secs.) |
|---|---|---|---|
| control | — | — | 60 |
| 24 | styrene | 0.20 | 35 |
| 25 | dicyclopentadiene | 0.20 | 40 |

EXAMPLE 26

The procedure of Example 1 was repeated using as the catalyst bis(deithyl sulphide)dichloro-$\mu$-dichlorodiplatinum II in the form of a solution in butyrolactone at a concentration of 1/30 g. atom platinum per liter, the amount of catalyst being 0.003 g. atom platinum per Kg. of total polysiloxane (i.e. 0.0065 part calculated as platinum per 100 parts total polysiloxanes) and using as the olefinic compound acrolein diethyl acetal. Table III shows the amount of olefinic compound and the cure time.

TABLE III

| Example | Olefinic compound | Proportion (mols per Kg Polysiloxanes) | Cure time (secs.) |
|---|---|---|---|
| control | — | — | 120 |
| 26 | acrolein diethyl acetal | 0.20 | 60 |

EXAMPLES 27 to 31

In these examples the polysiloxane composition was prepared by mixing 94 parts of a hydroxy-ended dimethylpolysiloxane of viscosity 19,900 cp at 20°C with 6 parts of a methylhydrogenpolysiloxane of viscosity 20 cp at 20°C and adding the ingredients shown in Table IV below. The polysiloxane compositions were catalysed and the cure times of the compositions determined as described in Example 1 except that the coat weight of polysiloxane on the paper was 3 g/m$^2$.

TABLE IV

| Example | Ingredient (parts) | | | | Cure time (secs.) |
| | cyclohexene | vinyltriethoxysilane | ethyl silicate | toluene | |
|---|---|---|---|---|---|
| Control | — | — | — | 100 | 30 |
| 27 | 2 | — | — | 98 | 23 |
| 28 | 5 | — | — | 95 | 20 |
| 29 | 20 | — | — | 80 | 17 |
| 30 | — | 2 | — | 100 | 19 |
| control | — | — | 2 | 100 | 29 |
| 31 | 2 | — | 2 | 98 | 23 |

These examples show the effect of the olefinic compound on liquid organopolysiloxane compositions diluted with a solvent.

EXAMPLES 32 to 34

Compositions were made and tested in the manner described in Example 1 the catalyst being the same and in the same amount as in that Example. In these Examples the olefinic compound was a polysiloxane containing a vinyl group and was used in amount equivalent to 1/10 mol vinyl per Kg. total polysiloxanes where the total polysiloxane excluded vinylsiloxy units but included organosiloxy units from the polysiloxane which contained the vinyl group. The ingredients used, other than the catalyst, and the cure times are shown in Table V below.

TABLE V

| Ingredients | control | EXAMPLE 32 | 33 | 34 |
|---|---|---|---|---|
| dimethyl polysiloxane | 88.0 | 88.0 | 83.3 | 83.5 |
| methylhydrogenpolysiloxane | 12.0 | 12.0 | 12.0 | 12.0 |
| vinyl tetramer | — | 0.86 | — | — |
| methylvinylpolysiloxane | — | — | 5.6 | — |
| methylphenylvinylpolysiloxane | — | — | — | 5.4 |
| cure time (secs.) | 21 | 8 | 12 | 12 |

The dimethyl polysiloxane was a hydroxy-ended dimethylpolysiloxane of viscosity 140 cp at 20°C, the methylhydrogen polysiloxane had a viscosity of 20 cp at 20°C, the vinyl tetramer was tetramethyltetravinyl-cyclotetrasiloxane, the methylvinyl polysiloxane contained 13.5 mol % methylvinylsiloxy units and 86.5 mol % of dimethylsiloxy units and had a viscosity of 500,000 cp at 20°C and the methylphenylvinylpolysiloxane contained 15 mol % of methylvinylsiloxy units, 8 mol % of methylphenylsiloxy units and 77 mol % of dimethylsiloxy units and had a viscosity of 4200 cp at 20°C.

EXAMPLE 35

Methylhydrogenallyloxypolysiloxane was prepared and used in amount equivalent to 1/10 mol of double bond per Kg. total polysiloxanes, the total polysiloxanes including methylhydrogensiloxy units from the methylhydrogenallyloxypolysiloxane.

Allyl alcohol (0.58 part) was mixed with methylhydrogen polysiloxane (8.6 parts) and 0.00195 part (calculated as platinum) of the catalyst used in example 1. As the allyl alcohol reacted, the temperature of the mixture rose and hydrogen was evolved. Reaction was completed by gently warming the mixture. On cooling, the mixture was added to 92 parts of hydroxy-ended dimethylpolysiloxane of viscosity 140 cp at 20°C and 0.01755 part (calculated as platinum) of the catalyst used in example 1. The cure time of this composition, determined by the method described in examples 1 to 23, was 11 seconds. This should be compared with the control shown in Table I where the cure time was 22 secs.

EXAMPLES 36 to 39

The procedure of Example 1 was repeated using the amounts of the olefinic compounds shown in Table VI below. There was also incorporated an ammonia derivative as shown. The catalyst temperature coefficient i.e. gel time at ambient temperature cure time at elevated temperature was determined and is also shown in Table VI.

TABLE VI

| Example | Olefinic compound | Proportion | Ammonia derivative | Proportion | Cure time (secs) | Gel time (mins) | Cat. temp. Coeff. |
|---|---|---|---|---|---|---|---|
| 36 | dicyclopentadiene | 1/5 | — | — | 10 | 279 | 1670 |
| 37 | '' | 1/5 | dimethylformamide | 1/1000 | 11 | 969 | 5290 |
| 38 | '' | 1/5 | 2-aminopyridine | 1/1000 | 15 | 1415 | 5660 |
| 39 | '' | 1/5 | acrylonitrile | 1/10 | 21 | >1046 | >2990 |

*Mols per Kg total organopolysiloxanes

Determination of gel time at ambient temperature

A portion of the catalysed polysiloxane composition was placed in a container maintained at 25°C and a stainless steel plunger immersed in the composition. The plunger consisted of a circular plate seven-eighths inch in diameter with a 4 inch × ⅛ inch diameter stem joined to its centre. The plunger weighed 6.2 g. and was oscillated mechanically in a vertical direction with an amplitude of one-half inch and a frequency of 1 cycle per minute by a 'Tecam Gelation Timer' (manufactured by Techne Ltd., Cambridge, England). When the polysiloxane composition gelled the movement of the plunger was inhibited whereupon the Gelation Timer automatically cut out. The time in minutes for which the Gelation Timer was in operation, i.e. the 'gel time', was recorded.

EXAMPLES 40 to 42

Bis (diethyl sulphide) dichloroplatinum II (0.0195 part calculated as platinum) was dissolved in a mixture of cyclohexene and dimethylformamide in amounts given in Table VII below and added to 92 parts of a hydroxy-ended dimethylpolysiloxane of viscosity 140 cp at 20°C mixed with 8 parts of a methylhydrogenpoysiloxane of viscosity 20 cp at 20°C. The catalyst temperature coefficient was determined in the same way as in example 36.

TABLE VII

| Example | Cyclohexene (parts) | Dimethylformamide (parts) | Cure time (secs) | Gel time (mins) | Cat. temp. Coeff. |
|---|---|---|---|---|---|
| 40 | 2 | — | 10 | 120 | 720 |
| 41 | 2 | 0.0074 | 12 | 552 | 2760 |
| 42 | 2 | 0.074 | 16 | 703 | 2630 |

EXAMPLES 43 to 50

Bis(diethyl sulphide) dichloroplatinum II (0.0146 part calculated as platinum) was dissolved in a mixture of 1.5 parts of vinyl triethoxysilane and a derivative of ammonia in amounts given in Table VIII below and added to the same polysiloxanes as used in example 40. The catalyst temperature coefficient was determined in the same way as described in example 36.

TABLE VII

| Example | Ammonia derivative | Parts | Cure time (secs.) | Gel time (mins) | Cat. temp. Coeff. |
|---|---|---|---|---|---|
| 43 | — | — | 8 | 151 | 1130 |
| 44 | n-propylamine | 0.00442 | 13 | 1037 | 4780 |
| 45 | di-n-propylamine | 0.00756 | 28 | 1465 | 3140 |
| 46 | diazoaminobenzene | 0.0148 | 12 | 324 | 1620 |
| 47 | trimethylamine | 0.00442 | 17 | 980 | 3460 |
| 48 | propionamide | 0.00547 | 18 | 1224 | 4080 |
| 49 | dimethylformamide | 0.00555 | 10 | 1059 | 6350 |
| 50 | diethylformamide | 0.00756 | 11 | 1036 | 5650 |

EXAMPLES 51 to 52

Compositions according to Example 32 with the addition of an ammonia derivative as shown in Table IX below were tested in the manner described in Example 36. The results are shown in Table IX.

TABLE IX

| Example | Ammonia derivative | Parts | Cure time | Gel time | Cat. temp. Coeff. |
|---|---|---|---|---|---|
| 32 | — | — | 8 | 101 | 759 |
| 51 | aniline | 0.0093 | 13 | 293 | 1350 |
| 52 | acetanilide | 0.0135 | 9 | 245 | 1630 |

EXAMPLES 53 to 55

The ingredients shown in Table X were added to a polysiloxane composition prepared by mixing 92 parts of hydroxy-ended dimethylpolysiloxane of viscosity 140 cp at 20°C with 8 parts of methylhydrogenpolysiloxane of viscosity 20 cp at 20°C and the catalyst, bis(dibutyl sulphide) dichloroplatinum II, then added dissolved in toluene to a concentration of 1/10 mol per liter and in amount 0.0195 part calculated as platinum. In the case of Example 55 the N-nitrosodiphenylamine was added dissolved in toluene to a concentration of 1/10 mol per liter. The proportions of the ingredients are given in mols per kg. total polysiloxanes. The catalyst temperature coefficient was determined in a similar way to that for example 36 except that the cure time was determined at a temperature of 120°C.

TABLE X

| Example | Ingredients | Proportion | Cure Time (secs) | Gel Time (mins) | Cat. Temp. Coeff. |
|---|---|---|---|---|---|
| Control | — | — | 30 | 235 | 470 |
| 53 | vinyltriethoxysilane | 1/10 | 14 | 177 | 759 |
| 54 | vinyltriethoxysilane<br>dimethylformamide | 1/10<br>1/1000 | 15 | 1136 | 4540 |
| 55 | N-nitrosodiphenlamine | 1/1000 | 16 | 263 | 985 |

I claim:
1. A hardenable composition comprising 80 to 99 parts by weight of a liquid hydroxy-ended diorganopolysiloxane, 1 to 20 parts by weight of a liquid organohydrogenpolysiloxane, an organic sulphur complex of platinum in an amount, calculated as platinum, up to 0.1 part by weight per 100 parts by weight of total organopolysiloxanes, said complex consisting of a compound of platinum containing one or more ligand organosulfur groupings of divalent sulfur which can donate electrons to form a bond with the platinum metal, and a compound containing at least one olefinic double bond in which the remaining valences of the 2 carbon atoms forming the double bond are satisfied by bonding to a hydrogen atom, and ether radical, a silicon atom, a sulphur atom or a carbon atom, the three remaining valences of which are satisfied by bonding atoms selected from carbon, silicon, sulphur, hydrogen and oxygen provided that not more than two of the valences are satisfied by bonding to oxygen, said compound being free from phosphorus, arsenic and divalent sulphur and derivatives of ammonia, wherein the three N valences of said ammonia are satisfied by bonding to an atom from the group S, H, O, N or Si, and said complex being present in amounts such that there is not less than 1 mol of olefinic double bond per g. atom of Pt.

2. A composition according to claim 1 wherein the diorganopolysiloxane is used in amount from 86 to 96 parts by weight and the organohydrogenpolysiloxane is used in amount from 14 to 4 parts by weight.

3. A composition according to claim 1 wherein the organo groups of the diorganopolysiloxane and of the organohydrogenpolysiloxane are selected from alkyl, aryl, alkaryl, aralkyl and cycloalkyl groups.

4. A composition according to claim 3 wherein the organo groups are selected from methyl, ethyl, propyl, phenyl, tetrachlorophenyl, trifluoromethyl and cyclohexyl groups.

5. A composition according to claim 1 wherein the viscosity of the diorganopolysiloxane is not less than 50 cP at 20°C.

6. A composition according to claim 1 wherein the viscosity of the organohydrogenpolysiloxane is from 10 to 100 cP at 20°C.

7. A composition according to claim 1 wherein the H/Si ratio in the organohydrogenpolysiloxane is from 1:10 to 1:1.

8. A composition according to claim 7 wherein the organohydrogenpolysiloxane consists of a chain of methylhydrogensiloxy units.

9. A composition according to claim 1, wherein the composition also contains a minor amount of a silane or siloxane containing alkoxy or aroxy groups, selected from the group consisting of ethyl silicate, methyltriethoxysilane and methylhydrogenpolysiloxanes having a proportion of silicon-bonded ethoxy or phenoxy groups.

10. A composition according to claim 1 wherein the organic sulphur complex contains a grouping selected from dimethyl sulphide, diethyl sulphide and dibutyl sulphide.

11. A composition according to claim 10 wherein the complex is bis(diethylsulphide) dichloroplatinum, bis(dibutylsulphide) dichloroplatinum or bis(diethylsulphide)dichloro-dichlorodiplatinum.

12. A composition according to claim 1 wherein the complex is used in amount from 0.001 to 0.05 part by weight (calculated as platinum) per 100 parts by weight of total polysiloxanes.

13. A composition according to claim 1 wherein the compound containing at least one olefinic double bond is cyclohexane, dicyclopentadiene, 1:3-cyclo-octadiene, cis,cis-1:5-cyclo-octadiene, styrene, butadiene, isoprene, ethyl vinyl ether, 2:3-dihydropyran, 2:5-dihydrofuran, acrolein diethyl acetal, benzoquinone, 2-cyclohexen-1-one, crotonaldehyde, mesityl oxide, allyl alcohol, allyl acetate, 2-allylphenol, allylacetone, divanyl sulphone, cyclic methylvinyl tetrasiloxane, a polysiloxane containing methylvinylsiloxy units or methylallyloxysiloxy units, vinyltriethoxyxilane or vinyl tris(2-methoxyethoxy)silane.

14. A composition according to claim 1 wherein the ratio of olefinic double bonds (expressed in mols) to the platinum complex (expressed in g. atoms of platinum) is not less than 1:1.

15. A composition according to claim 14 wherein the ratio is from 1000:1 to 10:1.

16. Substrates coated with a composition as claimed in claim 1.

17. Coated substrates as claimed in claim 16 wherein the substrate is paper.

* * * * *